(12) United States Patent
Shawan et al.

(10) Patent No.: US 7,186,793 B2
(45) Date of Patent: Mar. 6, 2007

(54) RECORDING/PLAYBACK APPARATUS, RECORDING/PLAYBACK METHOD, PROGRAM, AND STORAGE MEDIUM

(75) Inventors: Sundeep Kumar Shawan, New Delhi (IN); Kamalasasan Narayanan Modeeparampu, New Delhi (IN); Sukhwant Singh Bawa, New Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/404,013

(22) Filed: Mar. 31, 2003

(65) Prior Publication Data

US 2004/0192883 A1    Sep. 30, 2004

(51) Int. Cl.
*C08F 6/00*    (2006.01)
(52) U.S. Cl. ............... 528/480; 428/690; 558/418
(58) Field of Classification Search ........... 428/690; 528/480; 558/418
See application file for complete search history.

(56) References Cited

U.S. PATENT DOCUMENTS 3,582,498 A    6/1971  Bilow et al.
4,022,717 A *  5/1977  Clement ............. 528/396
6,441,124 B1 * 8/2002  Kathirgamanathan et al. ........... 528/229
2002/0185635 A1 * 12/2002 Doi et al. ............ 252/582

FOREIGN PATENT DOCUMENTS

GB    1000679    8/1965
GB    1182077    2/1970

OTHER PUBLICATIONS

Berlin, A.A., et al. "Thermal Stability of Oligomeric Arylenes" Database Chemabs Chemical Abstracts Service XP002269022 Database No. 74:3970 *Abstract* & Vysokomolekulyarnye Soedineniya vol. 12 (1970) pp. 2351-2361.
Berlin, A.A., et al. Thermomechanical study of oligomeric arylenes XP002269023 Database Chemabs, Chemical Abstracts Service Database No. 74:32119 *Abstracts* & Vysokomolekulyarnye Soedineniya.

* cited by examiner

*Primary Examiner*—Terressa Boykin
(74) *Attorney, Agent, or Firm*—Ladas & Parry LLP

(57) ABSTRACT

A copolymer of benzene and substituted benzene, particularly anthracene is disclosed. The copolymer is soluble in common organic solvents like chloroform, methylene chloride, benzene, toluene, dimethylformamide, N-methyl pyrrolidinone etc unlike the parent polymer poly-p-phenylene which is highly insoluble in organic solvents. The copolymer is thermally stable up to 380° C. and environmentally stable for at least 1 year. The copolymer is capable of being thermally evaporated useful for electroluminescent devices. The copolymer shows electroluminescene and can be used in the fabrication of an organic light emitting diode device.

21 Claims, 5 Drawing Sheets

RECORDING/PLAYBACK APPARATUS, RECORDING/PLAYBACK METHOD, PROGRAM, AND STORAGE MEDIUM

FIELD OF THE INVENTION

The present invention relates to a copolymer of benzene and substituted benzenes useful for electroluminescent devices. More particularly tile invention relates to a copolymer of benzene and anthracene as shown in the formula below and a process for the preparation of the said copolymer.

BACKGROUND OF THE INVENTION

During the last few decades, there has been a lot of research centered along the development of light emitting diodes using inorganic semiconductors for display as well as lighting applications. These efforts could not produce very large and flat luminescent displays which could replace the liquid crystal displays. The reason was that most of the light emitting devices were based on inorganic single crystals and the development of larger single crystals for large area applications were uneconomical. Inorganic thin film displays which were developed in its place also were not efficient enough for commercial applications. Therefore new materials have been sought for light emitting applications. Organic molecular materials have been well known for long time as very efficient fluorescent materials and therefore the attention diverted in this direction. This search has resulted in various electro luminescent organic materials. In 1987, C. W. Tang and Van Slyke, Applied Physics Letters, 51 (1987) 913 have obtained electro luminescence from aluminum tris (8-hydroxy quinoline), the efficiency of which was sufficient to consider commercial exploitation. This finding has created a lot of research interest in the field of organic luminescent materials. New organic electro luminescent (EL) materials have been invented which now cover the full range of the visible spectrum. Apart from small molecules, a number of polymeric materials have also been investigated. Several new polymeric materials have subsequently been found to have considerable electro luminescence efficiency suitable for commercial applications. Even though the EL devices made of molecular materials behave very similar to conventional LEDs made of inorganic semiconductors, they differ in many ways in their electronic and optical characteristics. This is evident from the fact that all molecular materials useful for EL purposes are insulators with resistivities of the order of $10^{15}$ to $10^{20}$ ohms cm. No electronic charge is present in the EL device without charge injection.

Therefore, charges injected from the electrodes play a crucial role in the device operation and all charges behave as space charge within the device. Further, only neutral excited states are produced by charge recombination and emission is due to emissive transitions from neutral excited states to ground states.

Emission due to direct recombination of positive and negative charges was not observed in molecular materials. An example of such a device using molecular materials is the fabrication of organic LEOs is in using metal chelates and dyes which show very good photoluminescence and electro luminescence (W. Brutting, Stefan Berleb, AG. Muckl, Organic Electronics, 2 (2001) 1–36). Herein, organic layers consisting of two layers namely N,N'-Bis(3-methyl phenyl) N,N'diphenylbenzidine (TPD) and aluminum quinolate (Alq3) are used as hole transport layer and emitter layer respectively which are sandwiched between the anode, Indium tin oxide (ITO) and cathode (Aluminum). Both small molecules based as well as polymer based organic LEDs work on nearly same principles and have nearly the same structure.

Recently much interest has been shown in the use of conductive conjugated polymers for organic light emitting diodes displays. The first scientific literature in the polymer semiconductors diode was published by J. H. Burroughs in Nature 347 (1990) 539 and relates to the use of poly phenylene vinylene (PPV) as an active electroluminescent layer. Devices using Al as a cathode had low brightness and low efficiency and later on D. D. C. Bradley, Synth. Metals 54 (1993)401 had shown that these devices operate at very high voltages (~40 volts). In a research paper in Advanced Materials 4(1992) 36, the problem associated with the generation of blue light by a LED is discussed and a blue light emitting PPP-LED is proposed which includes the ITO substrate and the aluminum electrodes. The application of double stranded poly-p-phenylene LPPP with partially protonized side groups in electro luminescence devices was first reported by G. Grem and G. Leising in Synthetic Metals (1993). Oligo phenylenes have also been successfully employed before as light emitting layers in electro luminescent devices as discussed by W. Graupner et al. in Mol. Cryst. Liq. Crystal, 256 (1994) 549. However, the conjugation length was at most equal to the length of the hexa phenylenes, with most of light emission in UV-region which is not only invisible to human eye but is also hazardous.

U.S. Pat. No. 6,353,082 relates to preparation of fluorene copolymers comprising disubstituted fluorine moieties and two other moieties containing delocalized pi-electrons which leads to making of a polymer light emitting diodes. These copolymers have excellent solubility in common organic solvents. However, the preparation involves first the synthesis of 9,9'-disubstituted 2,7-dibromofluorene at −78° C. under nitrogen. The process involves multistage synthesis and the resultant copolymer gives a red LED device.

U.S. Pat. No. 6,117,529 provides an electroluminescent device made using double stranded poly-p-phenylene (LPPP) with alkylated side chains attached to the matrix. The process involves multi steps for the preparation of polymer and moreover involves the incorporation of Coumarin 102 dye in the polymethylmethacrylate matrix.

U.S. Pat. No. 6,404,126 describes an electroluminescent device containing a light emitting layer containing a conjugated polymer poly phenylenevinylene (PPV) having substituent attached on the phenylene ring, an inorganic insulative electron injecting and transporting layer consisting of lithium oxide, rubidium oxide, potassium oxide etc. However, the patent relates to the development of device using PPV, commercially available and a costly precursor polymer.

U.S. Pat. No. 5,965,281 involves the use of substituted polyphenylene vinylene derivative, MEH-PPV (Poly [2methoxy-5(2'-ethylhexyloxyl)-1,4phenylenevinylene) as the polymer for the fabrication of device by incorporating lithium nonylphenoxy ether sulphate as the surfactant additive. This has resulted in the fabrication of LED device with better efficiency, but involves the use of costly monomers and precursor polymers.

U.S. Pat. No. 5,241,044 relates to a process for the preparation of soluble poly poly-p-phenylenes by reacting dihydroxy aromatic compounds such as orthoquinone and bisphenols with halogen substituted aliphatic sulphonic acids, halogen sulphonic acids or their anhydrides. The process involves the preparation of the polymer by using zero valence Ni catalyst. By this process poly-phenylenes have been synthesized but its electroluminescence has not been studied.

OBJECTS OF THE INVENTION

It is an object of the present invention to provide a copolymer of benzene and substituted benzenes useful for electroluminescent devices.

Another object of the present invention is to provide a copolymer useful for light emitting diodes.

Another object of the present invention is to provide a copolymer stable up to 380° C.

A further object of the present invention is to provide a copolymer capable of being thermally evaporated for thin film formation.

Still further object of the invention is to provide a copolymer which is stable in moist environment.

Yet further object of the present invention is to provide a copolymer with a shelf life of at least 1 year.

Another object of the invention is to provide a copolymer being soluble in common organic solvents like chloroform, methylene dichloride, benzene, toluene, dimethylformamide, N-methyl pyrrolidinone.

SUMMARY OF THE INVENTION

Accordingly the present invention provides a copolymer of benzene and substituted benzene useful for electroluminescent devices, said copolymer comprising benzene and an aromatic hydrocarbon in a molar ratio in the range of 1.0 to 0.1, the copolymer being stable up to a temperature of 380° C., is soluble in an organic solvent, is environmentally stable for at least 1 year, and is capable of being thermally evaporated for thin film formation.

In one embodiment of the invention the aromatic hydrocarbon is selected from a group consisting of anthracene, tetracene and pentacene.

In another embodiment of the invention the copolymer is used for fabrication of electroluminescent devices.

In yet another embodiment of the invention the copolymer dissolved in an organic solvent is capable of being spin coated on electrode surfaces for film formation.

In still another embodiment the copolymer dissolved in an organic solvent is sprayable on insulating surfaces for use in antistatic applications.

In a further embodiment the organic solvent is selected from the group consisting of chloroform, methylene chloride, benzene, toluene, dimethylformamide and N-methyl pyrrolidinone.

The present invention also relates to a process for the preparation of a copolymer of benzene and an aromatic hydrocarbon, comprising polymerising benzene and the aromatic hydrocarbon in the presence of $AlCl_3$ and $CuCl_2$ catalyst, filtering the reaction mixture after the completion of the polymerization to obtain the copolymer, washing the copolymer thoroughly and drying the copolymer, the resulting copolymer being stable up to a temperature of 380° C., is soluble in an organic solvent, is environmentally stable for at least 1 year, and is capable of being thermally evaporated for thin film formation.

In one embodiment of the invention the aromatic hydrocarbon is selected from a group consisting of anthracene, tetracene and pentacene.

In another embodiment of the invention the copolymer is used for fabrication of electroluminescent devices.

In yet another embodiment of the invention the copolymer dissolved in an organic solvent is capable of being spin coated on electrode surfaces for film formation.

In still another embodiment the copolymer dissolved in an organic solvent is sprayable on insulating surfaces for use in antistatic applications.

In a further embodiment the organic solvent is selected from the group consisting of chloroform, methylene chloride, benzene, toluene, dimethylformamide and N-methyl pyrrolidinone.

In another embodiment of the invention, the polymerisation is carried out at a temperature in the range of 30–40° C. under continuous stirring for a time period in the range of 4–6 hours In another embodiment of the invention, the temperature of polymerisation is 35° C.

In yet another embodiment of the invention, the copolymer obtained after filtration is washed with 50% hot HCl and then with hot distilled water In a further embodiment of the invention, the drying of the washed copolymer is done at a temperature in the range of 50–60° C. and under vacuum Formula 1 below represents structure of poly-p-phenylene (a) and the copolymer of benzene and anthracene (b).

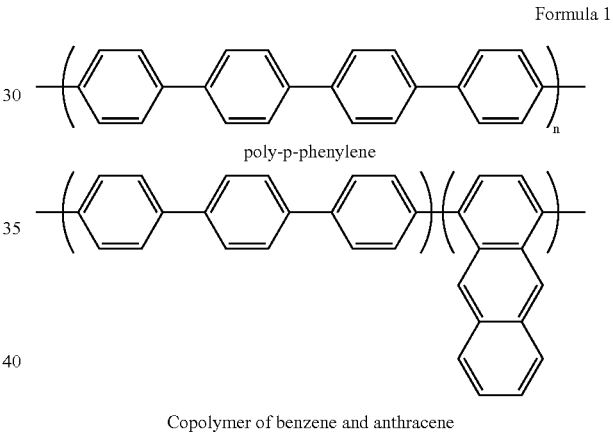

Formula 1 poly-p-phenylene

Copolymer of benzene and anthracene

BRIEF DESCRIPTION OF THE ACCOMPANYING DRAWINGS

In the drawing accompanying this specification:

FIG. 1 (curve a) represents UV-visible solution spectra of copolymer of benzene and anthracene in chloroform, present in the mole ratios 1.0:0.1. The absorption bands observed are 521 nm, 390nm, 319 nm and 252 nm.

FIG. 1 (curve b) represents UV-visible solution spectra of copolymer of benzene and anthracene in chloroform, present in the mole ratios 1.0:0.05.The absorption bands observed are 518 nm, 380 nm, 320 nm and 250 nm.

FIG. 1 (curve c) represents UV-visible solution spectra of copolymer of benzene and anthracene in chloroform present in the mole ratios 1.0:0.1 The absorption bands observed are 480 nm, 380 nm, 394 nm and 280 nm.

0.01. The characteristic peaks observed in the FTIR spectra of the copolymer are 2924,2861,1469,1019,906,808 and 562 cm−1.

Figure 1:
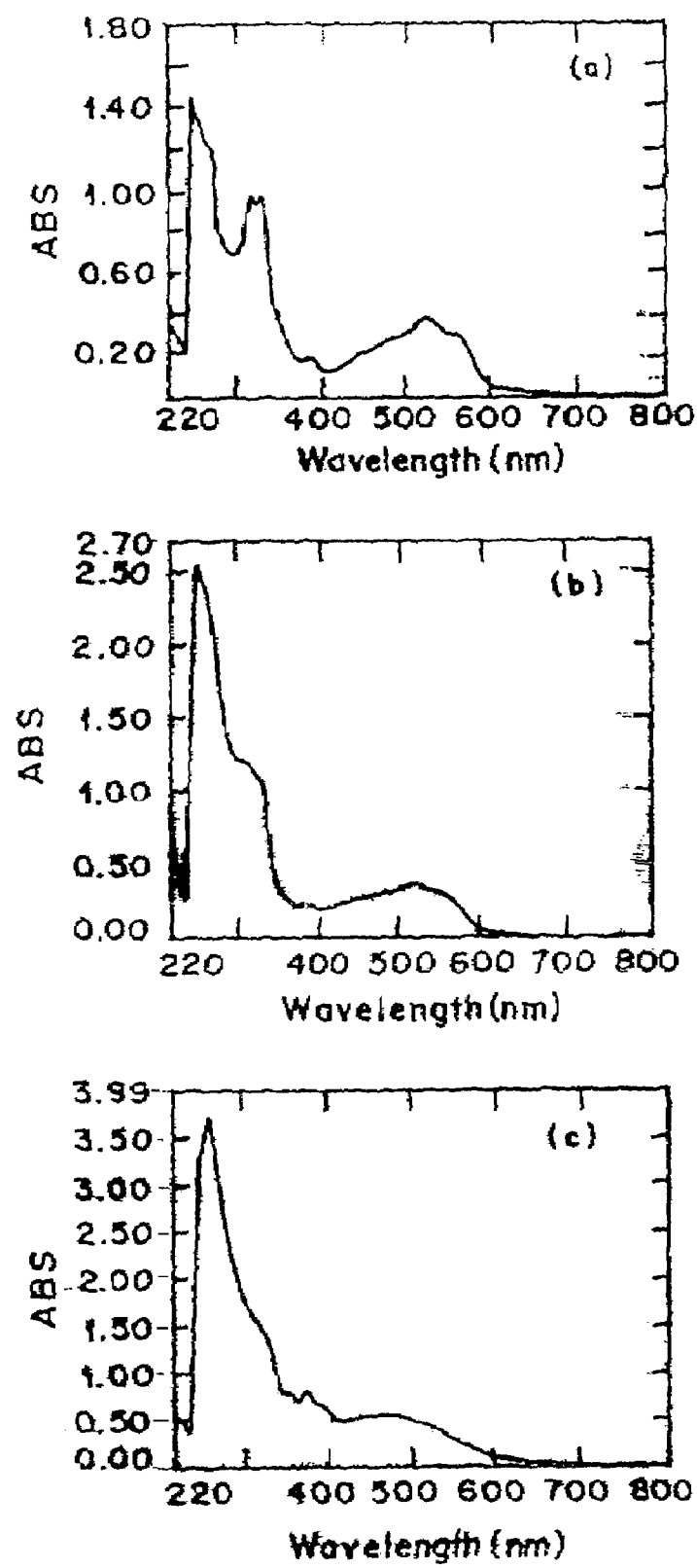
FIG. 1 (curve d) represents UV-visible solution spectra of copolymer of benzene and pentacene in N-metyl pyrrolidinone, present in the mole ratios 1.0:0.01. The absorption bands observed are at 741 nm, 453 nm, 332 nm and 288 nm.
Figure 1D:
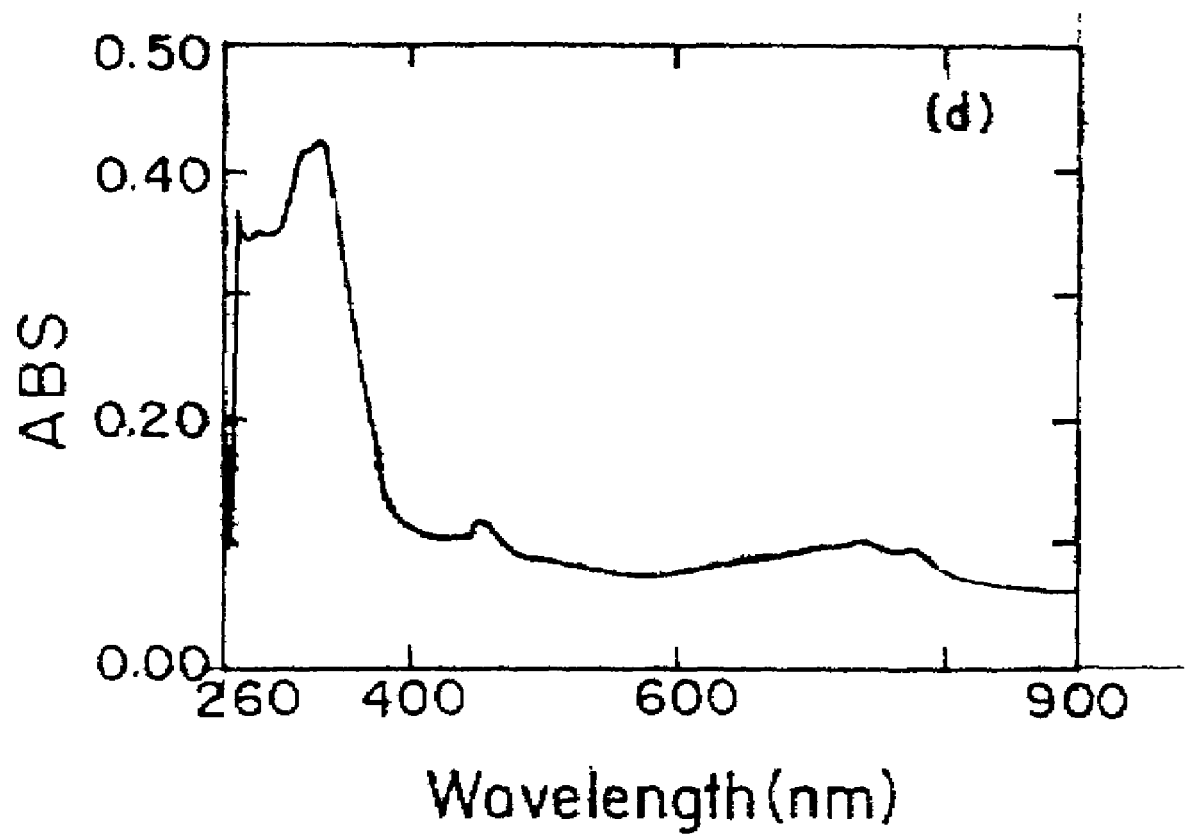
Figure 2:
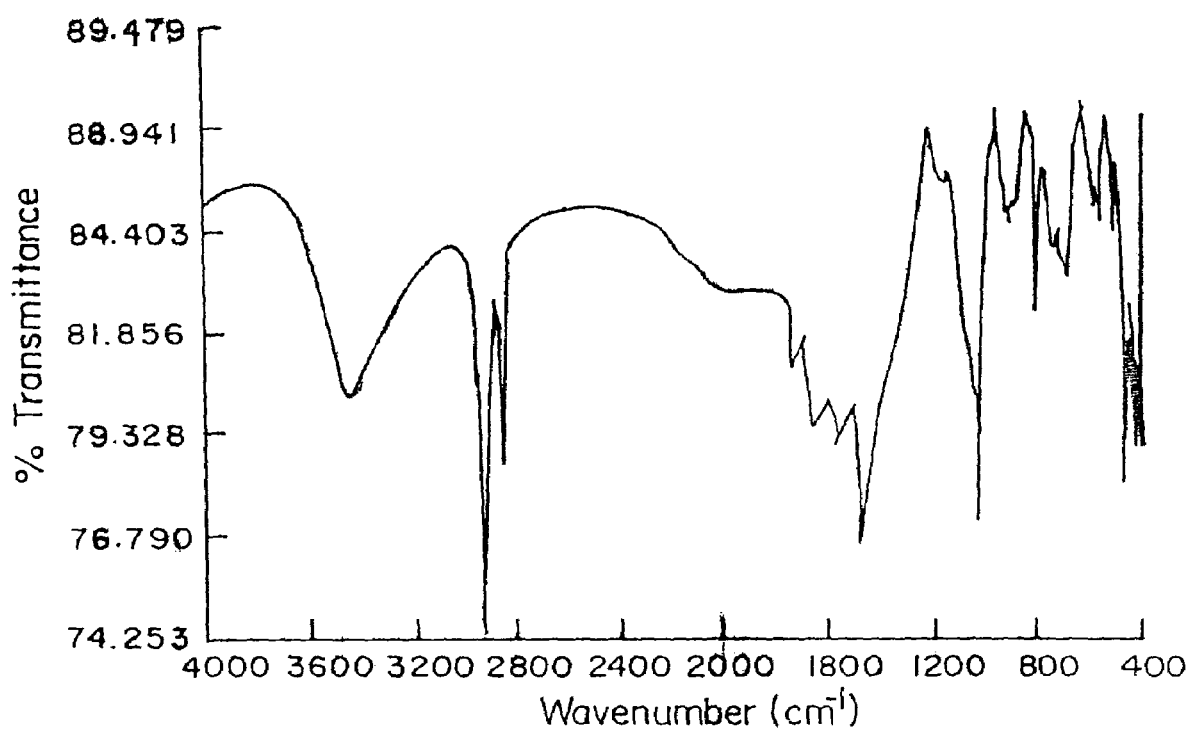
FIG. 2 represents FTIR spectra of the copolymer of benzene and anthracene present in the mole ratios of 1.0.
Figure 3:
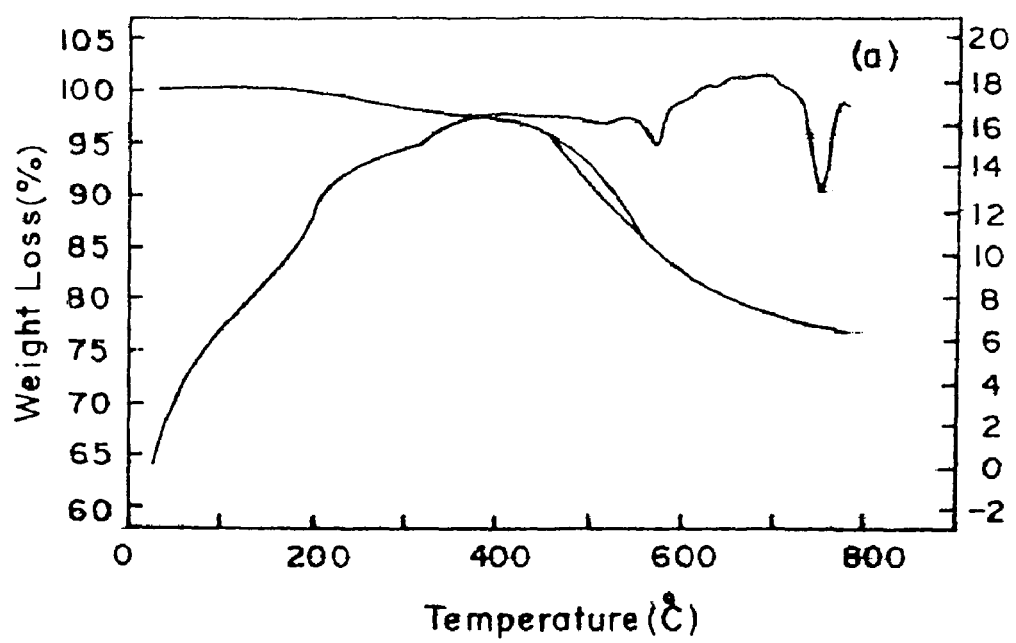
Figure 3:
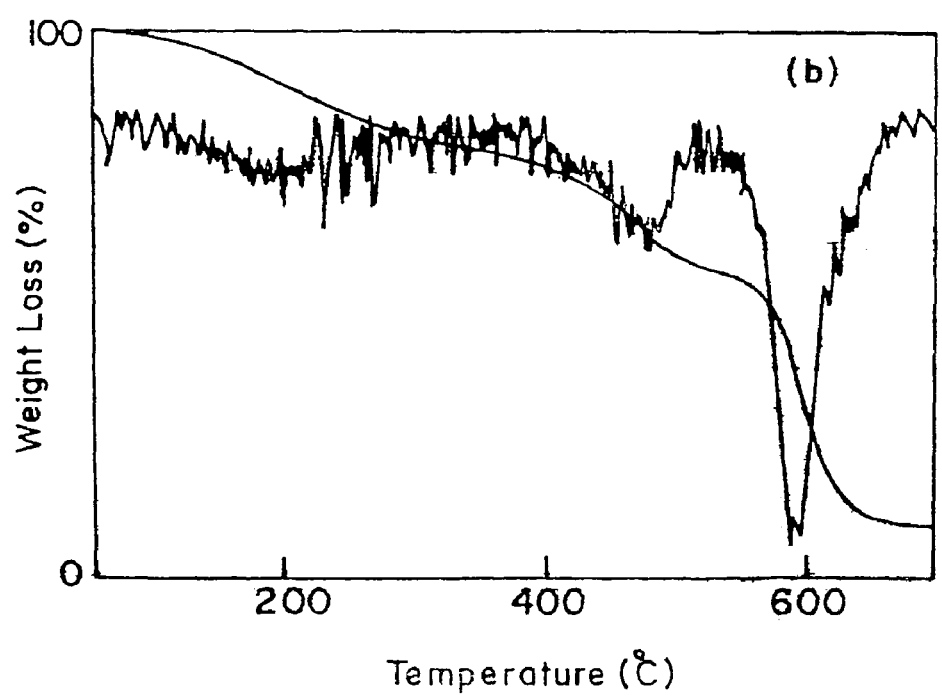

FIG. 3 (curve a) represents thermogravimetric analysis curve of the copolymer of benzene and anthracene (1.0:0.01).

FIG. 3 (curve b) shows the thermogravimetric analysis curve of the copolymer of benzene and anthracene present in the mole ratios (1.0:0.1).

Figure 4:
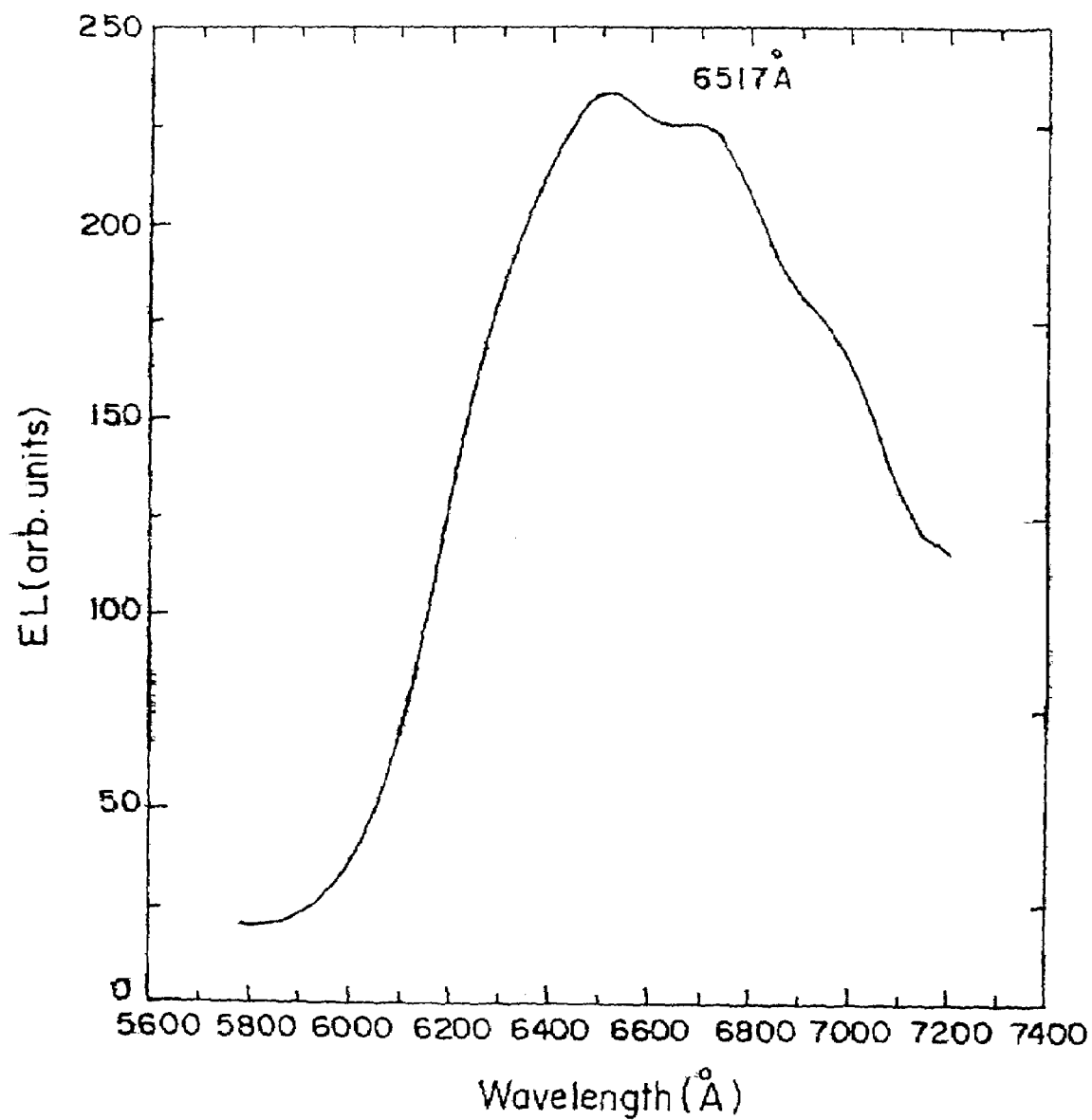

FIG. 4 represents the electroluminescence spectrum of the copolymer of benzene and anthracene present in the mole ratios of 1.0:0.01 of the system ITO/copolymer/Al).

DETAILED DESCRIPTION OF THE INVENTION

A copolymer of benzene and substituted benzene, particularly anthracene is disclosed. The copolymer is soluble in common organic solvents like chloroform, methylene dichloride, benzene, toluene, dimethylformamide, N-methyl pyrrolidinone etc unlike the parent polymer poly-p-phenylene which is highly insoluble in organic solvents. The copolymer is thermally stable up to 380° C. and environmentally stable for at least 1 year. The copolymer is capable of being thermally evaporated useful for elecroluminescent devices. The copolymer shows electroluminescene and is useful in fabrication of an organic light emitting diode device.

The present invention provides a copolymer of benzene and substituted benzene useful for electroluminescent devices which comprises: benzene and aromatic hydrocarbons in molar ratio in a range of 1.0 to 0.1, characterized in that the copolymer is stable up to a temperature of 380° C., is soluble in common organic solvents, environmentally stable for at least 1 year, is capable of being thermally evaporated for thin film formation. The aromatic hydrocarbon is selected from a group consisting of anthracene, tetracene and pentacene. The copolymer is used for fabrication of electroluminescent devices or is capable of spin coating on electrode surfaces for film formation. The copolymer dissolved in organic solvents can also be sprayed on insulating surfaces for use in antistatic applications. The organic solvent may be selected from a group consisting of chlorogorm methylene chloride, benzene, toluene, dimethylformamide and N-methyl pyrrolidinone.

In the present invention, the copolymer of benzene and benzene substituted polymer preferably anthracene is prepared in the presence of $AlC_3$ and $CuCl_2$ catalyst preferably at a temperature of 35° C. temperature in the range of 30–40° C. continuously stirring the reaction mixture for 4–6 hours, filtering the reaction mixture after the completion of the polymerization, washing thoroughly with 50% hot HCl and finally with hot distilled water and drying the copolymer at 50–60° C. under vacuum. The resulting copolymer is soluble in common organic solvents like chloroform, methylene dichloride, benzene, ethanol, dimethyl formamide (DMF), N-methyl pyrrolidinone (NMP), tetrahydrofuran (THF) and the like.

The UV-visible solution spectra of the copolymer of benzene and anthracene present in the mole ratios 1.0:0.01 gives absorption bands at 521 nm, 380 nm, 319 nm and 252 nm. Increasing the concentration of anthracene in the reaction system leads to shift in the absorption bands and decrease in the intensity of the electroluminescent device. The copolymer of benzene with pentacene gives absorption bands at 741 nm, 453 nm, 332 nm and 288 nm. The absorption bands in the UV-visible absorption spectra observed for the copolymer are associated with the different transitions of the conjugated aromatic system of the copolymer. It has been observed that with the increase in the concentration of anthracene in the reaction system, there is a marked shift in the absorption band values. It has been also observed that the conjugation length of the copolymer decreases with the increase in the concentration of anthracene. It has also been observed that the intensity of the electroluminescent device fabricated using higher concentrations of anthracene is considerably less compared to the system containing lower concentration of anthracene present in the mole ratio of 0.01. The copolymer shows thermal stability up to 380° C. From 380° C. to 600° C., there is loss of 18% due to the decomposition of the copolymer backbone as is depicted in FIG. 4(a), As seen in FIG. 4(b), the copolymer shows thermal stability up to 140° C. and from 140° C. to 380° C. and from 380° C. to 550° C.) the copolymer shows weight loss of the order of 18% (total weight loss 24%) and 21% (total weight loss 45%). This shows that increasing the concentration of anthracene in the reaction system decreases the thermal stability of the copolymer.

The copolymer shows electro luminescence and photoluminescence and the device fabricated using above conjugated copolymer shows red electro luminescence.

Novelty of the invention is that the copolymer of benzene and benzene substituted polymer is soluble in common organic solvents and is thermally stable up to 380° C.

The following examples are given to illustrate the process of the present invention and should not be construed to limit the scope of the present invention.

EXAMPLE 1

Preparation of Copolymer of Benzene and Anthracene:

0.1 mole of benzene and 0.01 mole of anthracene are taken in a glass reaction vessel. The reaction mixture is stirred thoroughly and then anhydrous CuCl2 and $AlC_3$ was added. The reaction mixture is stirred for 4 hours, till a crimson red precipitate of copolymer is obtained. The mixture is filtered and washed thoroughly with hot HCl and then with distilled water till the colour of the filtrate is colourless. The precipitate so obtained is vacuum dried at 55° C. for 24 hours. The copolymer was then characterized by. FTIR and UV-visible spectroscopy as well as thermo gravimetric analysis techniques.

EXAMPLE 2

Preparation of Copolymer of Benzene and Anthracene 0.1 mole of benzene and 0.05 mole of anthracene are taken in a reaction vessel. The reaction mixture is stirred thoroughly and then anhydrous CuCl2 and AlC3 was added. The reaction mixture is stirred for 4 hours, till a crimson red precipitate of copolymer is obtained. The mixture is filtered and washed thoroughly with hot HCl and then with distilled water till the colour of the filtrate is colourless. The precipitate so obtained is vacuum dried at 55° C. for 24 hours. The copolymer was then characterized by FTIR and UV-visible spectroscopy as well as thermo gravimetric analysis techniques.

EXAMPLE 3

Preparation of Copolymer of Benzene and Anthracene 0.1 mole of benzene and 0.1 mole of anthracene are taken in a reaction vessel. The reaction mixture is stirred thoroughly and then anhydrous GuCl2 and AlC13 was added. The reaction mixture is stirred for 5 hours, till a crimson red precipitate of copolymer is obtained. The mixture is filtered and washed thoroughly with hot HCl and then with distilled water till the colour of the filtrate is colourless. The precipitate so obtained is vacuum dried at 60° C. for 24 hours. The copolymer was then characterized by FTIR and UV-visible spectroscopy as well as thermo gravimetric analysis techniques.

EXAMPLE 4 (COMPARATIVE EXAMPLE)

Preparation of Polymer of Benzene 0.1 mole of benzene is polymerized in the presence of anhydrous $CuCl_2$ and $AlCl_3$. The reaction mixture is stirred for 6 hours, till a brown precipitate of poly benzene is obtained. The mixture is filtered and washed thoroughly with hot HCl and then with distilled water till the colour of the filtrate is colourless. The precipitate so obtained is vacuum dried at 55° C. for 24 hours. The polymer was then tested for its solubility in common organic solvents like chloroform, tetrahydrofuran, methanol, N-methylpyrrolidinone but it was found insoluble in all organic solvents. The thermal stability of the polymer was also carried by thermo gravimetric analysis technique. TGA curve shows thermal stability of the polymer upto 484° C. and after that the degradation of the polymer takes place.

EXAMPLE 5

Preparation of Copolymer of Benzene and Pentacene 0.1 mole of benzene and 0.01 mole of pentacene are taken in a glass reaction vessel. The reaction mixture is stirred thoroughly and then anhydrous $CuCl_2$ and AlC3 was added. The reaction mixture is stirred for 4 hours, till a brownish precipitate of copolymer is obtained. The mixture is filtered and washed thoroughly with hot HCl and then with distilled water till the colour of the filtrate is colourless. The precipitate so obtained is vacuum dried at 55° C. for 24 hours. The copolymer was then characterized by FTIR and UV-visible spectroscopy as well as thermo gravimetric analysis techniques.

THE MAIN ADVANTAGES OF THE PRESENT INVENTION ARE:

1. The organic solvent soluble copolymer electroluminescence in OLED device fabrication.
2. The copolymer is environmentally and thermally stable without any loss in the stability of the copolymer.

We claim:

1. A copolymer of benzene and an aromatic hydrocarbon other than benzene in a molar ratio in the range of 1.0:0.01 to 1.0:0.1, wherein the copolymer has electroluminescent properties, is stable up to a temperature of 380° C., is soluble in an organic solvent, is environmentally stable for at least 1 year, and is capable of being thermally evaporated for thin film formation.

2. A copolymer as claimed in claim 1 wherein the aromatic hydrocarbon is selected from the group consisting of anthracene, tetracene and pentacene.

3. A method consisting of providing the copolymer as claimed in claim 1 and fabricating an electroluminescent device with use of the copolymer.

4. A copolymer as claimed in claim 1 wherein the copolymer is dissolvable in an organic solvent and the dissolved copolymer is capable of being spin coated on electrode surfaces for film formation.

5. A copolymer as claimed in claim 1 wherein the copolymer is dissolvable in an organic solvent and the dissolved copolymer is sprayable on insulating surfaces for use in antistatic applications.

6. A copolymer as claimed in claim 1 wherein the organic solvent is selected from the group consisting of chloroform, methylene chloride, benzene, toluene, dimethylformamide and N-methyl pyrrolidinone.

7. A process for the preparation of a copolymer of benzene and an aromatic hydrocarbon, comprising polymerizing benzene and an aromatic hydrocarbon in a reaction mixture in the presence of $AlCl_3$ and $CuCl_2$, filtering the reaction mixture after completion of the polymerization to obtain a copolymer of the benzene and the aromatic hydrocarbon, washing the copolymer thoroughly and drying the copolymer to form a resulting copolymer that has electroluminescent properties, is stable up to a temperature of 380° C., is soluble in an organic solvent, is environmentally stable for at least 1 year, and is capable of being thermally evaporated for thin film formation.

8. A process as claimed in claim 7 wherein the aromatic hydrocarbon is selected from the group consisting of anthracene, tetracene and pentacene.

9. A process as claimed in claim 7 further comprising fabricating an electroluminescent device with use of the resulting copolymer.

10. A process as claimed in claim 7 wherein the resulting copolymer is dissolvable in an organic solvent and the dissolved copolymer is capable of being spin coated on electrode surfaces for film formation.

11. A process as claimed in claim 7 wherein the resulting copolymer is dissolvable in an organic solvent and the dissolved copolymer is sprayable on insulating surfaces for use in antistatic applications.

12. A process as claimed in claim 7 wherein the organic solvent is selected from the group consisting of chloroform, methylene chloride, benzene, toluene, dimethylformamide and N-methyl pyrrolidinone.

13. A process as claimed in claim 7 wherein the polymerization is carried out at a temperature in the range of 30–40° C. under continuous stirring for a time period in the range of 4–6 hours.

14. A process as claimed in claim 7 wherein the temperature of the polymerization is 35° C.

15. A process as claimed in claim 7 wherein the washing after filtration is done with 50% hot HCl and then with hot distilled water.

16. A process as claimed in claim 7 wherein the drying of the washed copolymer is done at a temperature in the range of 50–60° C. and under vacuum.

17. A copolymer of claim 1, wherein the polymer comprises the following repeating units:

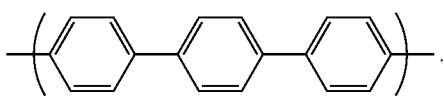

18. A copolymer of claim 17, wherein the polymer comprises the following repeating units:

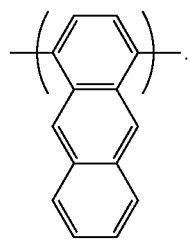

19. A copolymer of claim 1, wherein the copolymer is formed from monomers consisting of benzene monomers and also of substituted benzene monomers selected from the group consisting of anthracene, tetracene and pentacene monomers.

20. A solution comprising the copolymer of claim 19 and an organic solvent selected from the group consisting of chloroform, methylene chloride, benzene, toluene, dimethylformamide and N-methyl pyrrolidinone.

21. A copolymer of claim 1, wherein the aromatic hydrocarbon is anthracene and the copolymer is formed by a process comprising polymerizing benzene and an aromatic hydrocarbon in a reaction mixture in the presence of $AlCl_3$ and $CuCl_2$, filtering the reaction mixture after completion of the polymerization to obtain a copolymer of the benzene and the aromatic hydrocarbon, washing the copolymer thoroughly and drying the copolymer to form the copolymer.

* * * * *

UNITED STATES PATENT AND TRADEMARK OFFICE
CERTIFICATE OF CORRECTION

| | | |
|---|---|---|
| PATENT NO. | : 7,186,793 B2 | |
| APPLICATION NO. | : 10/404013 | |
| DATED | : March 6, 2007 | |
| INVENTOR(S) | : Sundeep Kumar Dhawan et al. | |

It is certified that error appears in the above-identified patent and that said Letters Patent is hereby corrected as shown below:

On title page, item 54, "RECORDING/PLAYBACK APPARATUS, RECORDING/PLAYBACK METHOD, PROGRAM, AND STORAGE MEDIUM" should read -- COPOLYMER OF BENZENE AND SUBSTITUTED BENZENE --.

Title page, Item (75) inventors: "Shawan" should read --Dhawan--.

Column 1, lines 1-3, "RECORDING/PLAYBACK APPARATUS, RECORDING/PLAYBACK METHOD, PROGRAM, AND STORAGE MEDIUM" should read -- COPOLYMER OF BENZENE AND SUBSTITUTED BENZENE --.

Signed and Sealed this

Tenth Day of July, 2007

JON W. DUDAS
*Director of the United States Patent and Trademark Office*